Oct. 8, 1963

H. A. CLEMENTS 3,106,276

SYNCHRONOUS SELF-SHIFTING CLUTCHES

Filed Feb. 6, 1961

2 Sheets-Sheet 1

INVENTOR
HERBERT ARTHUR CLEMENTS

BY
Benjamin Sweedler
ATTORNEY

United States Patent Office 3,106,276
Patented Oct. 8, 1963

3,106,276
SYNCHRONOUS SELF-SHIFTING CLUTCHES
Herbert Arthur Clements, Weybridge, England, assignor to S.S.S. Gears Limited, Isleworth, Middlesex, England, a British company
Filed Feb. 6, 1961, Ser. No. 87,212
Claims priority, application Great Britain Feb. 22, 1960
1 Claim. (Cl. 192—109)

This invention relates to synchronous self-shifting clutches of the type comprising a first toothed rotary clutch member provided with clutch teeth, a second rotary clutch member, and an intermediate member provided with clutch teeth and constrained for helical movement relative to the second clutch member whereby to bring the clutch teeth of the intermediate member into and out of engagement with the clutch teeth of the first clutch member, pawl and ratchet mechanism being provided for initiating clean inter-engagement of the teeth of the intermediate member and first clutch member upon relative angular movement of the first and second clutch members in one direction.

In some cases it is desirable to provide a clutch of the above type with a dash-pot, e.g., using lubricating oil as the working medium, which imposes restraint with a cushioning effect on the movement of the intermediate member into full toothed engagement. Under some conditions of operation, however, the intermediate member may not remain in the fully engaged position after first moving into this position, as when it is associated with a resilient shaft system subjected to torque fluctuations. During the initial engaging movement of the intermediate member the oil is discharged from the dashpot through restricted passages, and it is desirable that as soon as the clutch moves to a disengaged condition the dashpot should be rapidly recharged in readiness for the next engaging movement of the intermediate member. The object of the present invention is to provide a clutch of the type described in which a dashpot is provided having this advantageous feature.

In accordance with the present invention, in a clutch of the type described the intermediate member and one of the first and second clutch members have surfaces which are disposed in an annular liquid retaining chamber and which are separated when the intermediate member is in a disengaged condition and which co-act to form a dashpot chamber when the intermediate member moves towards its fully engaged position.

In a proposed arrangement the said surfaces are surfaces on the intermediate member and the first clutch member.

Figure 1:
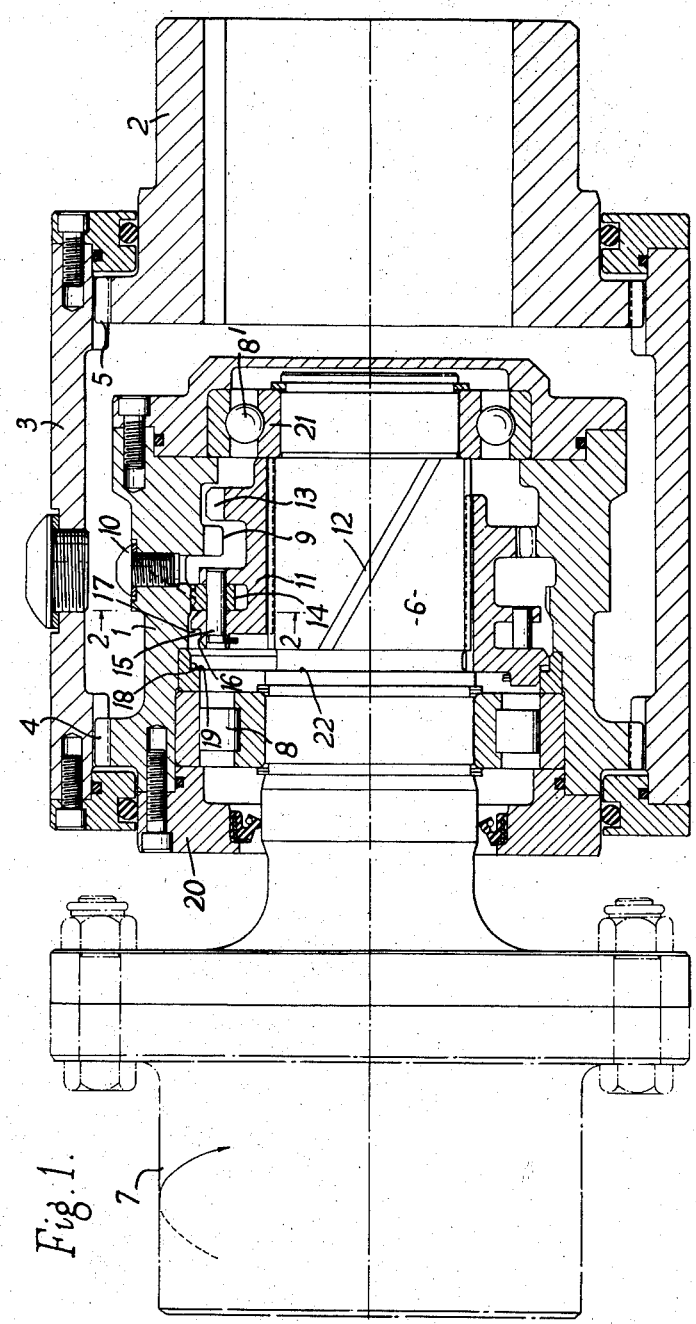
Figure 2:
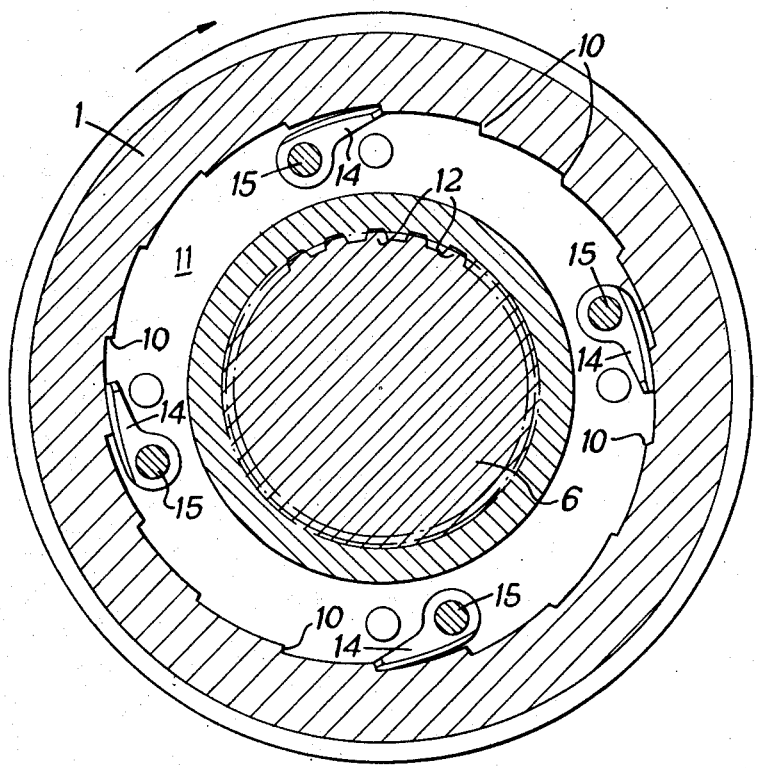

An embodiment of the invention is shown in the accompanying drawings, in which:

FIG. 1 is a view in longitudinal section of a clutch according to the invention, the clutch being shown disengaged in the upper half of the figure and engaged in the lower half, and FIG. 2 is cross-sectional view on the line II—II of FIG. 1.

In the drawings, the first clutch member comprises a generally cylindrical casing 1 closed at one end and drivably connected to a shaft 2 via a sleeve 3 with which the casing 1 and shaft 2 are in toothed engagement at 4 and 5. The second clutch member 6 is formed on the end of a shaft 7 and projects into the first clutch member 1 from the open end thereof and is journalled within the first clutch member 1 in two axially spaced bearings 8 and 8', the bearing 8 being adapted to withstand axial thrust and to maintain the desired relative location of the clutch members 1 and 6. The first clutch member 1 is formed with an internal ring of clutch teeth 9 and with a ring of internal ratchet teeth 10.

The intermediate member of the clutch comprises a clutch sleeve 11 mounted externally on the second clutch member 6, and formed with internal right hand helical splines engaged with external splines 12 on the second clutch member 6. The clutch sleeve 11 is formed with a ring of external clutch teeth 13 which in the fully disengaged position of the clutch sleeve 11 (upper half of FIG. 1) are positioned axially to one side of the internal clutch teeth 9. The clutch sleeve 11 also carries four pawls 14 arranged in diametrically opposite pairs (see FIG. 2) on pawl pins 15. In the disengaged condition of the clutch (upper half of FIG. 1) the pawls 14 are radially aligned with the internal ratchet teeth 10. The pawls 14 are nose heavy so that when the shaft 7 is rotating the noses of the pawls are urged radially outwardly.

The clutch sleeve 11 is formed, at the end thereof remote from the closed end of the first clutch member 1, with an external annular shoulder having a cylindrical surface 16 parallel to the clutch axis and a plane annular surface 17 normal to the clutch axis. The first clutch member 1 is formed with an internal annular shoulder having a cylindrical surface 18 parallel to the clutch axis and a plane annular surface 19 normal to the clutch axis. When the clutch sleeve 11 is in its fully disengaged position (upper half of FIG. 1) the shoulders of the clutch sleeve 11 and of the first clutch member 1 are spaced apart axially so that there is a relatively wide gap between them. The first clutch member 1 is formed at its open end with a radially inwardly directed annular flange 20, thereby forming with the closed end of the member 1 and the intermediate internal surfaces a liquid-retaining chamber which contains oil which when the first clutch member 1 is rotating forms into a ring the radially inner surface of which is radially within the cylindrical surface 16 of the shoulder of the clutch sleeve 11.

The operation of the clutch is as follows. Assume that as viewed in FIG. 2 the shaft 2 and first clutch member 1 are rotating in a clockwise direction as indicated by the arrow, and that the second clutch member 6 is stationary. Under these circumsaances the clutch sleeve 11 is in its fully disengaged position in which it is up against an axial stop formed by the inner bearing race 21, and the pawls 14 are inert. The gap between the annular shoulders 16, 17 and 18, 19 is full of oil, under centrifugal pressure, and the annular ring of oil extends to the boundary end walls of the above-mentioned liquid-retaining chamber, so that the axial oil pressures therein are balanced.

If now the shaft 7 and second clutch member 6 are accelerated in the same direction of rotation as the first clutch member 1, the clutch sleeve 11 rotates with them and centrifugal force acts on the pawls 14 so that their noses are urged radially outwardly, and so long as the angular speed of the second clutch member 6 is below that of the first clutch member 1 the ratchet teeth 10 ratchet past the pawls 14. When the second clutch member attains synchronism with and tends to over-run the first clutch member 1, pawls 14 engage two diametrically opposite ratchet teeth 10, and due to the helical splines of the clutch sleeve 11 and second clutch member 6 the clutch sleeve 11 is shifted helically along the second clutch member 6 in the direction (to the left in FIG. 1) to engage its external clutch teeth 13 cleanly with the internal clutch teeth 9 of the first clutch member 1. Continued acceleration of the shaft 7 now causes the shaft 2 to be driven thereby via the clutch. During the clutch-engaging movement the external annular shoulder 16, 17 of clutch sleeve 11 approaches the internal annular shoulder 18, 19 of the first clutch member 1 and the reduction in the width of the gap between them causes oil to be progressively forced out of the gap so that some initial restraint is imposed on the movement of the clutch sleeve 11. The path available for passage of oil out of the said gap becomes increasingly narrower, so that the restraint on the movement of the clutch sleeve 11 increases progressively. Towards the end of the clutch-engaging movement of the clutch sleeve 11 the cylindrical surfaces 16 and 18 and the annular surfaces 17 and 19 co-act to form an annular dashpot chamber which is substantially closed with the exception of restricted leakage paths between the said surfaces, thereby cushioning the final part of the clutch-engaging movement.

When the clutch sleeve 11 has moved up to an axial stop 22 the clutch teeth 10 and 13 are in full engagement and the first clutch member 1 is driven by the second clutch member 6. If the shaft 7 and second clutch member 6 are now decelerated the interaction of the clutch teeth 9 and 13 causes the clutch sleeve 11 to shift out of toothed engagement with the first clutch member 1, and during this movement the widening gap between the shoulders of the first clutch member 1 and clutch sleeve 6 automatically recharges with oil, by a suction effect assisted by the action of centrifugal force. Hence the dashpot is again effective even if clutch disengagement is followed very rapidly by a further engagement.

I claim:

A synchronous self-shifting clutch comprising a first rotary clutch member, clutch teeth on said member, a second rotary clutch member, an intermediate member, clutch teeth on said intermediate member, means constraining said intermediate member for helical movement relative to said second clutch member into and out of toothed engagement with said first clutch member, pawl and ratchet mechanism for initiating inter-engagement of the clutch teeth of said intermediate member with the clutch teeth of said first clutch member upon relative angular movement of said first and second clutch members in one direction, said intermediate member and one of said first and second members having surfaces that co-act to form a substantially closed annular dash-pot chamber only when the intermediate member in moving towards full toothed engagement with said first clutch member has reached a position of partial toothed engagement with said first clutch member, the clutch including an annular liquid-retaining chamber in which the said surfaces are disposed, the said one clutch member having a recess therein formed by a cylindrical surface and an adjacent annular surface, and the intermediate member having a cooperating recess therein formed by a cylindrical surface and an adjacent annular surface, one of said recesses opening radially outwardly and the other opening radially inwardly and the said surfaces of the recesses being the said surfaces that co-act to form the substantially closed annular dash-pot chamber.

References Cited in the file of this patent
UNITED STATES PATENTS

| | | |
|---|---|---|
| 1,830,744 | Logue | Nov. 3, 1931 |
| 2,062,930 | Pritchard | Dec. 1, 1936 |
| 2,140,216 | Wissman | Dec. 13, 1938 |
| 2,913,084 | Short | Nov. 17, 1959 |
| 2,971,621 | Sinclair et al. | Feb. 14, 1961 |